US012132259B2

(12) United States Patent
Ye et al.

(10) Patent No.: US 12,132,259 B2
(45) Date of Patent: Oct. 29, 2024

(54) WIRELESS COMMUNICATION DEVICE

(71) Applicant: WISTRON NEWEB CORPORATION, Hsinchu (TW)

(72) Inventors: Yu-Hsin Ye, Hsinchu (TW); Kuang-Yuan Ku, Hsinchu (TW); Cheng-Geng Jan, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 177 days.

(21) Appl. No.: 17/817,165

(22) Filed: Aug. 3, 2022

(65) Prior Publication Data

US 2023/0064857 A1 Mar. 2, 2023

(51) Int. Cl.
*H01Q 21/06* (2006.01)
*H01Q 9/04* (2006.01)

(52) U.S. Cl.
CPC ......... *H01Q 21/065* (2013.01); *H01Q 9/0414* (2013.01); *H01Q 9/0421* (2013.01)

(58) Field of Classification Search
CPC .. H01Q 21/065; H01Q 9/0414; H01Q 9/0421; H01Q 1/42
See application file for complete search history.

(56) References Cited

U.S. PATENT DOCUMENTS

| | | | |
|---|---|---|---|
| 2013/0044035 A1 | 2/2013 | Zhuang | |
| 2018/0159203 A1* | 6/2018 | Baks | H01Q 9/045 |
| 2021/0075107 A1 | 3/2021 | Samsung | |

FOREIGN PATENT DOCUMENTS

| | | |
|---|---|---|
| CN | 104505588 A | 4/2015 |
| CN | 106099394 B | 1/2019 |

OTHER PUBLICATIONS

Yan Zhang, Zhe Song, Wei Hong, Raj Mittra, “Wideband High-Gain ±45° Dual-Polarized Stacked Patch Antenna Array for Ku Band Back-Haul Services”, IET Microwaves, Antennas & Propagation, 2020, vol. 14 Iss. 1, pp. 53-59. (Year: 2020).*

Search Report issued on Jan. 16, 2023 for EP application No. 22190549.0.

* cited by examiner

*Primary Examiner* — Dieu Hien T Duong

(74) *Attorney, Agent, or Firm* — McClure, Qualey & Rodack, LLP

(57) ABSTRACT

A wireless communication device is provided. The wireless communication device includes a circuit substrate, an antenna cover, a first antenna array and a first power divider. The first antenna array is arranged between the circuit substrate and the antenna cover. The first antenna array includes two first antenna elements and two second antenna elements. The first antenna elements are disposed on a first surface of the circuit substrate. The second antenna elements are arranged on the antenna cover and correspond to the first antenna elements, respectively. Each of the second antenna elements and a corresponding one of the first antenna elements are separated from and coupled to each other. In response to the two first antenna elements being fed with a first signal provided by a signal source from the first power divider, the first antenna array is configured to generate a radiation pattern having a first polarization direction.

16 Claims, 8 Drawing Sheets

WIRELESS COMMUNICATION DEVICE

CROSS-REFERENCE TO RELATED PATENT APPLICATION

This application claims the benefit of priority to Taiwan Patent Application No. 110131568, filed on Aug. 26, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a wireless communication device, and more particularly, to a wireless communication device with a stacked antenna structure.

BACKGROUND OF THE DISCLOSURE

At present, 5G customer premises equipment (CPE) are generally classified into outdoor unit (ODU) and indoor unit (IDU) types based on requirement. CPE products of the outdoor unit type can be installed either by users themselves or by professionals. However, products for different installation methods are not only different in appearances and sizes, but also different in internal antenna structures and antenna characteristics. Generally, the antenna structures in the CPE products that are meant to be installed by professionals have higher gains, but also have larger sizes. Therefore, an existing antenna product cannot meet varying requirements, and the size of the high-gain antenna can yet be miniaturized.

Therefore, how different antenna structures can be integrated to improve designs of antenna products has become an important issue in the related art.

SUMMARY OF THE DISCLOSURE

In response to the above-referenced technical inadequacies, the present disclosure provides a wireless communication device.

In one aspect, the present disclosure provides a wireless communication device that includes a circuit substrate, an antenna cover, a first antenna array and a first power divider. The antenna cover is disposed on the circuit substrate, and the first antenna array disposed between the circuit substrate and the antenna cover. The first antenna array includes two first antenna elements and two second antenna elements. The first antenna elements are disposed on a first surface of the circuit substrate, and the second antenna elements are arranged on the antenna cover and correspond to the first antenna elements, respectively. Each of the second antenna elements and a corresponding one of the first antenna elements are separated from and coupled to each other. The first power divider includes a first input port and two first output sections, the first input port is connected between the two first output sections, and the two first output sections are connected to the two first antenna elements along a first direction, respectively. In response to the two first antenna elements being fed with a first signal provided by a signal source from the first power divider, the first antenna array is configured to generate a radiation pattern having a first polarization direction.

Therefore, in the wireless communication device provided by the present disclosure, since the first antenna array includes the two first antenna elements and the two second antenna elements, the two first antenna elements are disposed on the first surface of the circuit substrate, the two second antenna elements are disposed on the antenna cover and correspond to the two first antenna elements, respectively, and each of the second antenna elements and the corresponding one of the first antenna elements are separated from and coupled to each other, a stacked antenna array structure can be formed to achieve high gain and miniaturized volume for the wireless communication device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
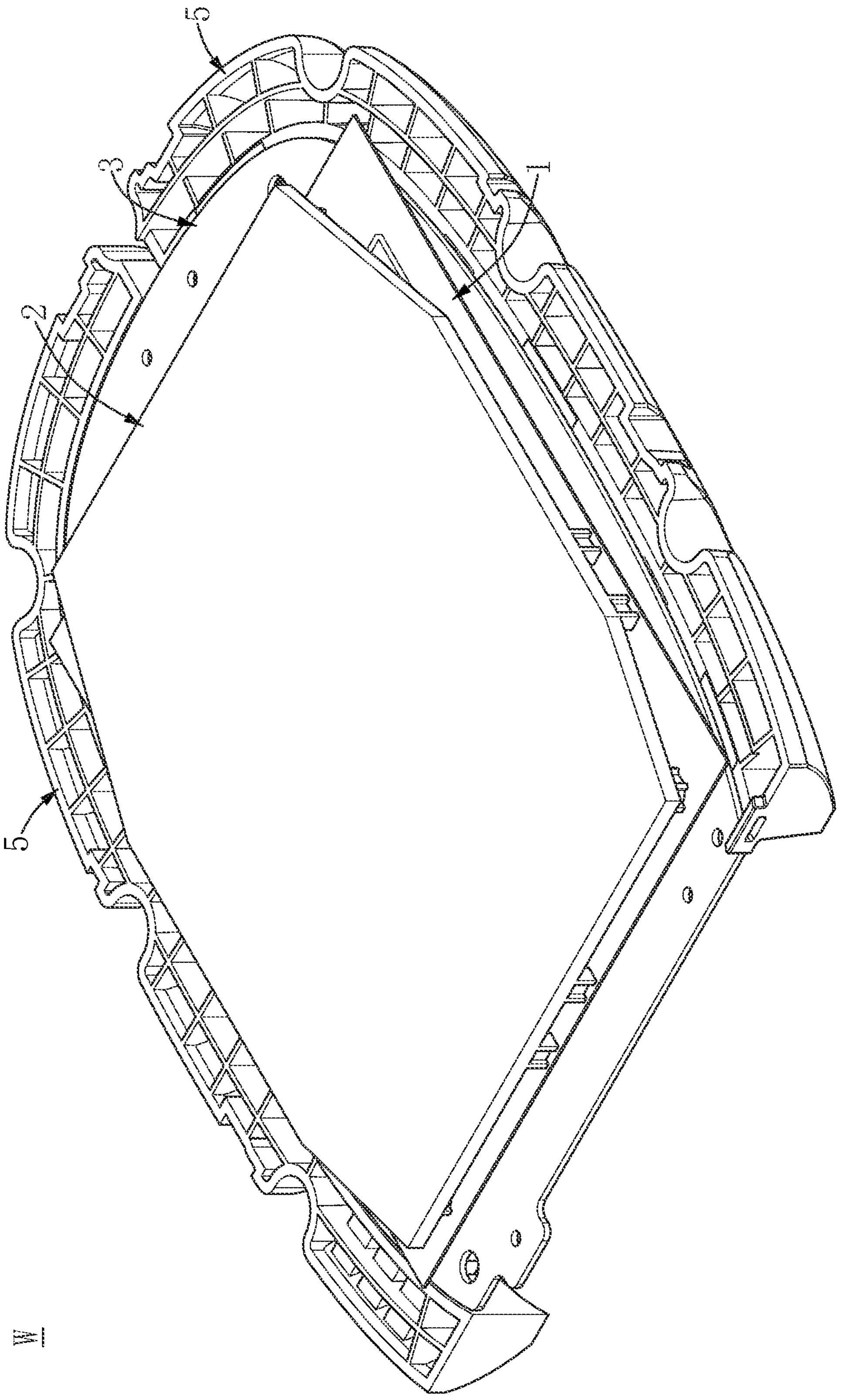
FIG. 1 is a schematic perspective view of a wireless communication device of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like. In addition, the term "connect" used herein refers to a physical connection between two elements, which can be a direct connection or an indirect connection. The term "couple" used herein refers to two elements being separated and having no physical connection, and an electric field generated by a current of one of the two elements excites that of the other one.

EMBODIMENTS

Reference is made to FIG. 1, which is a schematic perspective view of a wireless communication device of the present disclosure. An embodiment of the present disclosure provides a wireless communication device W, the wireless communication device W mainly includes a circuit substrate 1, an antenna cover 2, a ground plate 3 and an annular frame 5.

Figure 2:
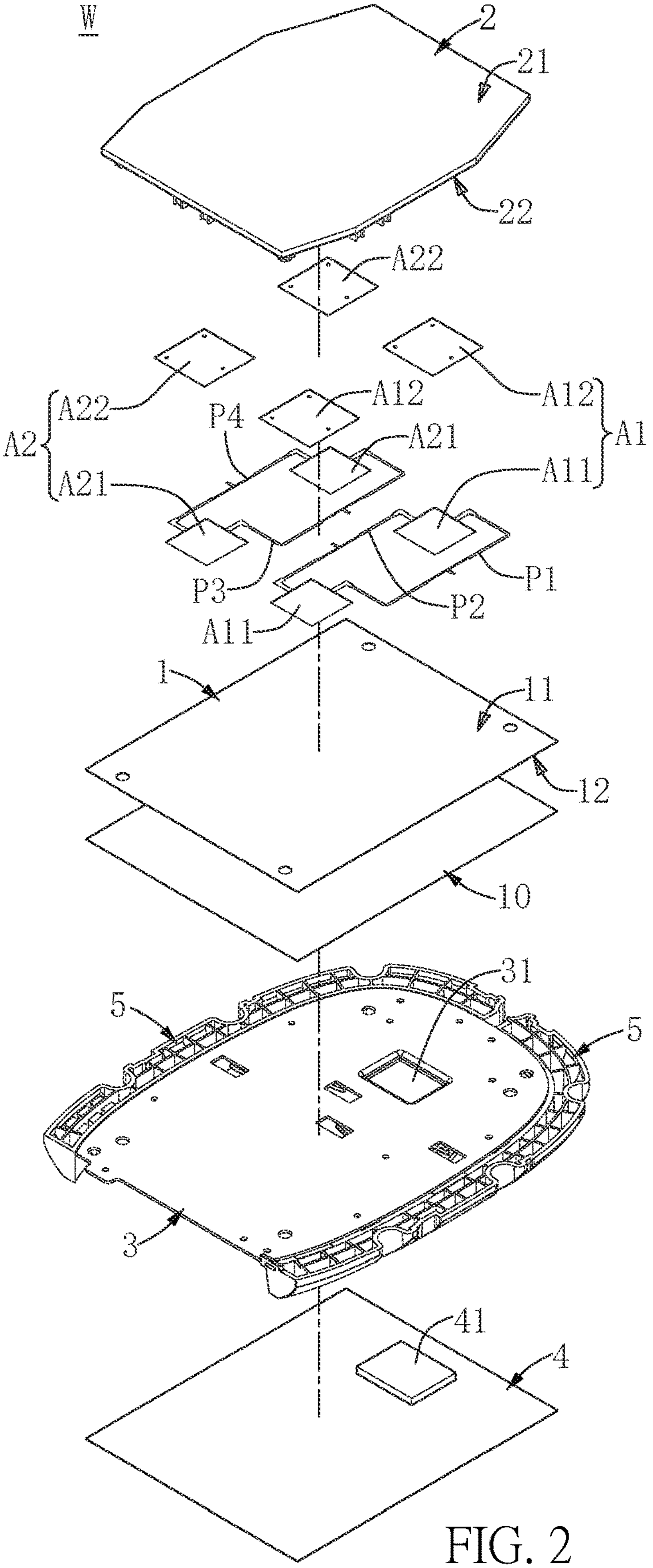
FIG. 2 is a schematic exploded view of the wireless communication device of the present disclosure.
Figure 3:
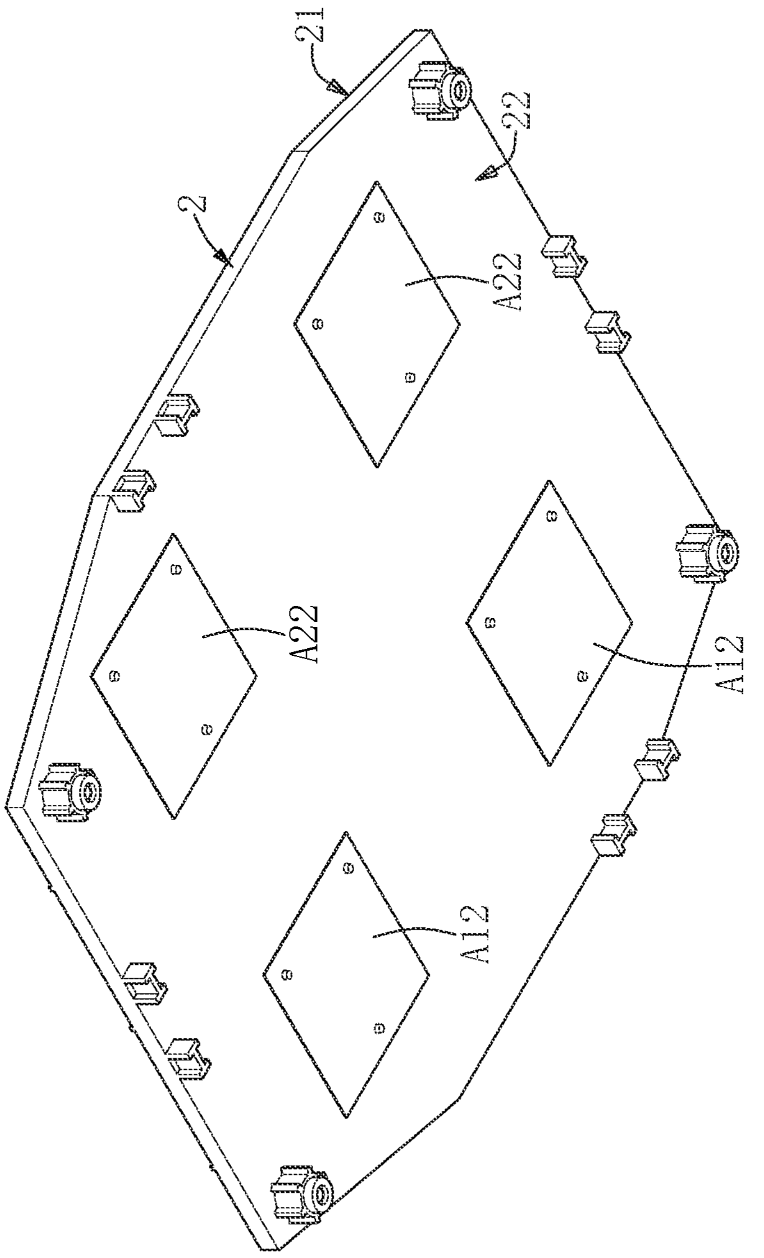
FIG. 3 is a schematic perspective view of an antenna cover of the wireless communication device of the present disclosure.
Figure 4:
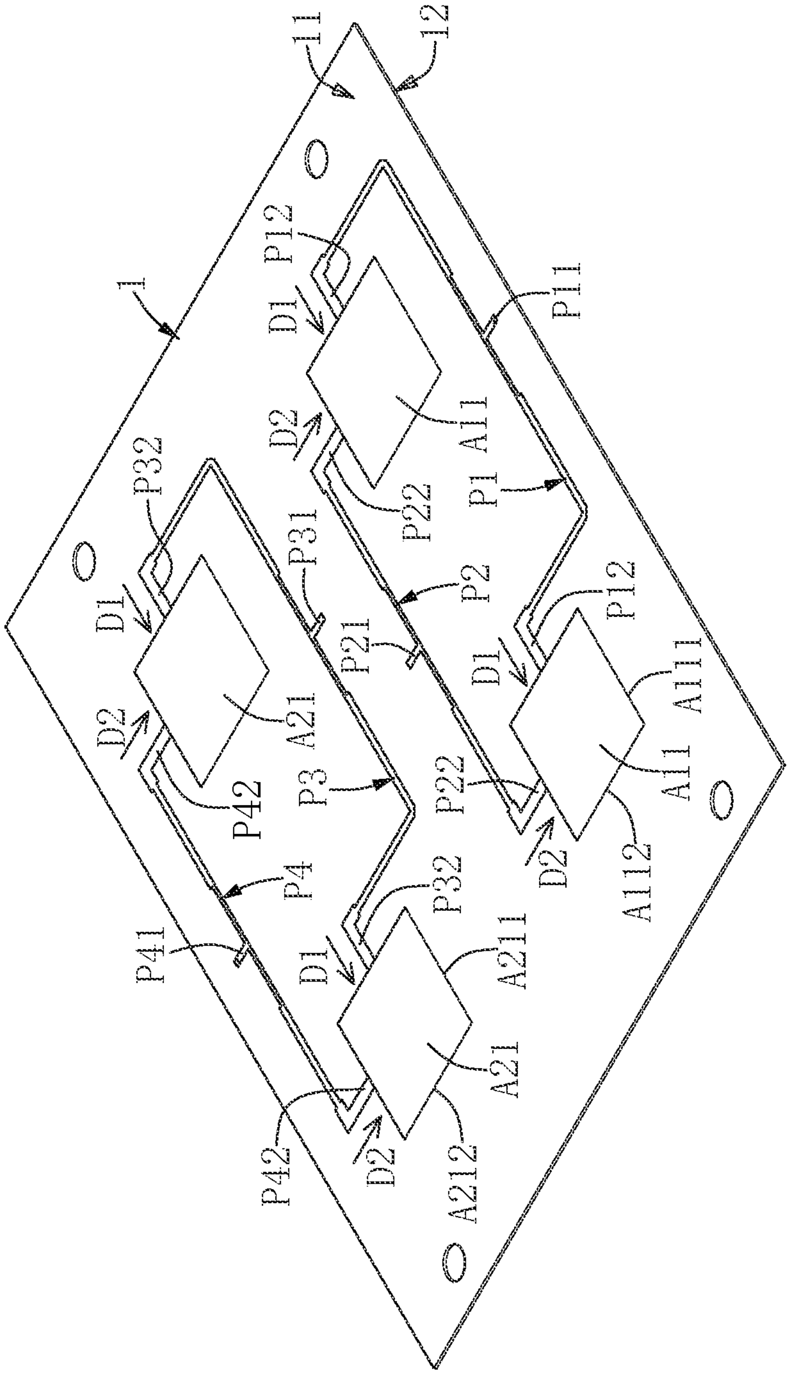
FIG. 4 is a schematic perspective view of the antenna array of the wireless communication device of the present disclosure.
Figure 5:
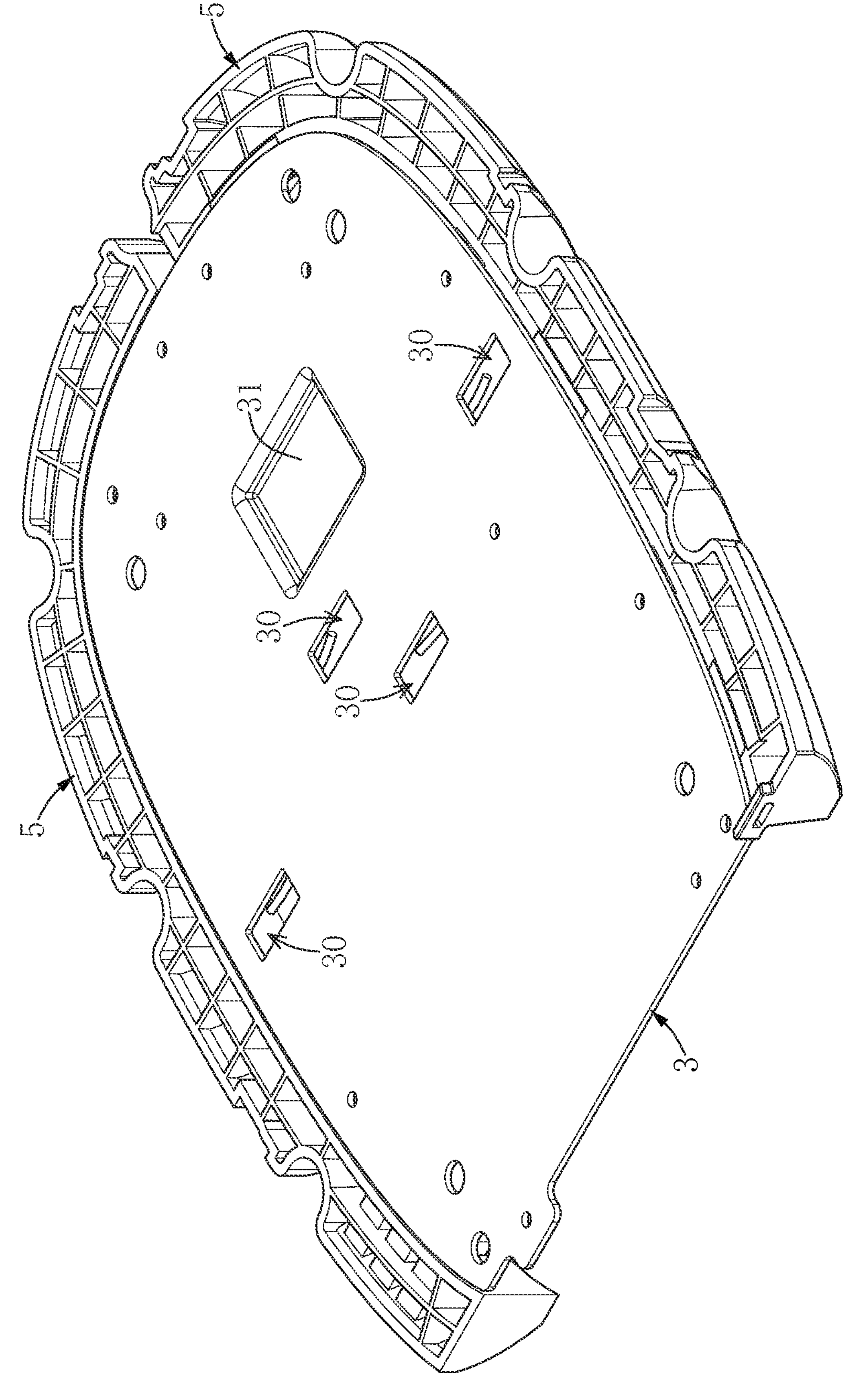
FIG. 5 is a schematic perspective view of a ground plate and an annular frame of the wireless communication device of the present disclosure.

Reference is made to FIGS. 3, 4, and 5, in which FIG. 2 is a schematic exploded view of the wireless communication device of the present disclosure, FIG. 3 is a schematic perspective view of an antenna cover of the wireless communication device of the present disclosure, and FIG. 4 is a schematic perspective view of the antenna array of the wireless communication device of the present disclosure. The wireless communication device W further includes a first antenna array A1 and a first power divider P1. The first antenna array A1 is disposed between the circuit substrate 1 and the antenna cover 2. The first antenna array A1 includes two first antenna elements A11 and two second antenna elements A12. The circuit substrate 1 includes a first surface 11 and a second surface 12 opposite to each other, the two first antenna elements A11 are arranged on the first surface 11 of the circuit substrate 1, and the two second antenna elements A12 are arranged on a lower surface 22 of the antenna cover 2 and correspond to the two first antenna elements 11, respectively. Each of the second antenna elements A12 and a corresponding one of the first antenna elements A11 are separated from and coupled to each other. As shown in FIG. 4, the first power divider P1 is disposed on the first surface 11 of the circuit substrate 1. The first power divider P1 includes a first input port P11 and two first output sections P12. The first input port P11 is connected between the two first output sections P12, and the two first output sections P12 are respectively connected to the two first antenna elements A11 along a first direction D1. In addition, the wireless communication device W further includes a second power divider P2, and the second power divider P2 and the first power divider P1 are also disposed on the first surface 11 of the circuit substrate 1. The second power divider P2 includes a second input port P21 and two second output sections P22, and the second input port P21 is connected between the two second output sections P22. The two second output sections P22 are connected to the two first antenna elements A11 along a second direction D2, respectively, and the first direction D1 is perpendicular to the second direction D2. It is worth mentioning that, in this embodiment, the first antenna element A11 and the second antenna element A12 both have a square shape, but the present disclosure is not limited thereto, and the first antenna elements A11 and the second antenna elements A12 can both be in other shapes, such as a circle. That is, the first antenna elements A11 and the second antenna elements A12 need to be symmetrical structures. Therefore, as shown in FIG. 4, taking one of the first antenna elements A11 as an example, a distance from a connection point where the first output segment P12 is connected to the first antenna element A11 to an opposite side A112 of the first antenna element A11 is equal to a distance from a connection point where the second output section P22 is connected to the first antenna element A11 to another opposite side A111 of the first antenna element A11.

Reference is made to FIGS. 2 and 4. The first power divider P1 and the second power divider P2 can be electrically connected to a signal source through the first input port P11 and the second input port P21, respectively. In the present disclosure, the signal source is a radio frequency (RF) module 41, which can be used to output at least one RF signal. In response to a first signal provided by the RF module 41 being input into the first input port P11 of the first power divider P1 and fed into the first antenna elements A11 through the two first output sections, the two first antenna elements A11 are respectively coupled to the two second antenna elements A12 to generate a radiation pattern having a first polarization direction. On the other hand, in response to a second signal provided by the RF module 41 being input to the second input port P21 of the second power divider P2 and fed into the two first antenna elements A11 through the two second output sections P22, the two first antenna elements A11 are respectively coupled to the two second antenna elements A12 to generate a radiation pattern with a second polarization direction. In the present disclosure, the first polarization direction and the second polarization direction are orthogonal to each other. For example, the first polarization direction is a vertical polarization direction, and the second polarization direction is a horizontal polarization direction. However, the present disclosure is not limited thereto.

The above-mentioned example is only one possible embodiment and is not intended to limit the present disclosure. Reference is further made to FIGS. 2 to 4, showing that the wireless communication device W can further include a second antenna array A2, a third power divider P3 and a fourth power divider P4 in one preferred embodiment of the present disclosure. The second antenna array A2 is disposed between the circuit substrate 1 and the antenna cover 2, and the second antenna array A2 is disposed side by side with the first antenna array A1. The second antenna array A2 includes two third antenna elements A21 and two fourth antenna elements A22. The two third antenna elements A21 are disposed on the first surface 11 of the circuit substrate 1, the two fourth antenna elements A22 are disposed on the lower surface 22 of the antenna cover 2 and correspond to the two third antenna elements A21, respectively, and each of the third antenna elements A21 and a corresponding one of the fourth antenna elements A22 are separated from and coupled to each other. The third power divider P3 includes a third input port P31 and two third output sections P32, the third input port P31 is connected between the two third output sections P32, and the two third output sections P32 are respectively connected to the two third antenna elements A21 along the first directions D1. The fourth power divider P4 includes a fourth input port P41 and two fourth output sections P42, the fourth input port P41 is connected between the two fourth output sections P42, and the two fourth output sections P42 are respectively connected to the two third antenna elements A21 along the second direction D2. Similarly, shapes of the third antenna elements A21 and the fourth antenna elements A22 also need to be symmetrical structures such as those having the shape of a square or a circle. Therefore, as shown in FIG. 4, taking one of the third antenna elements A21 as an example, a distance from a connection point between the third output segment P32 and the third antenna element A21 to an opposite side A212 of the third antenna element A21 is equal to a distance from a connection point between the fourth output section P42 and the third antenna element A21 to another opposite side A211 of the third antenna element A21.

Based on the above, the third power divider P3 and the fourth power divider P4 can be electrically connected to the signal source, i.e., the radio frequency module 41, through the third input port P31 and the fourth input port P41, respectively. In response to a third signal provided by the RF module 41 being input to the third input port P31 of the third power divider P3 and fed to the two third antenna elements A21 through the two third output sections P32, the two third antenna elements A21 are respectively coupled to the two fourth antenna elements A22 to generate a radiation pattern with a third polarization direction. In response to a fourth signal provided by the RF module 41 being input to the fourth input port P41 of the fourth power divider P4 and fed into the two third antenna elements A21 through the two fourth output sections P42, the two third antenna elements A21 are respectively coupled to the two fourth antenna elements A22 to generate a radiation pattern with a fourth polarization direction. The third polarization direction and the fourth polarization direction are orthogonal to each other, for example, the third polarization direction is a vertical polarization direction and the fourth polarization direction is a horizontal polarization direction.

Therefore, in the present disclosure, the first direction D1 and the second direction D2 are perpendicular to each other, such that the polarization directions between the different radiation patterns generated by the second antenna array A2 are orthogonal to each other. Further, the first direction D1 and the second direction D2 are perpendicular to each other, such that the polarization directions between the different radiation patterns generated by the first antenna array A1 are orthogonal to each other, and the polarization directions between the different radiation patterns generated by the second antenna array A2 are orthogonal to each other.

Referring to FIG. 4, the first power divider P1, the second power divider P2, the third power divider P3 and the fourth power divider P4 can be, for example, microstrips disposed on the circuit substrate 1. The first power divider P1, the second power divider P2, the third power divider P3, and the fourth power divider P4 are in a staggered configuration. Specifically, the first power divider P1 and the second power divider P2 are respectively arranged on both sides of the first antenna array A1, the third power divider P3 and the fourth power divider P4 are respectively arranged on both sides of the second antenna array A2, and the second power divider P2 and the third power divider P3 are arranged between the first antenna array A1 and the second antenna array A2. Through the staggered configuration of the first power divider P1, the second power divider P2, the third power divider P3 and the fourth power divider P4, mutual interference (i.e., poor isolation) caused by closely arranged power dividers with the same polarization directions can be effectively improved.

Referring to FIG. 2 and FIG. 3, the two second antenna elements A12 and the two fourth antenna elements A22 can be, for example, fixed on a surface of the antenna cover 2 facing the circuit substrate 1 by screws (not shown). However, the present disclosure is not limited thereto. In the present disclosure, through a structural configuration of the first antenna element A11, the second antenna element A12, the third antenna element A21 and the fourth antenna element A22, the first antenna array A1 and the second antenna array A2 each form a stacked patch antenna structure. Furthermore, an area of a vertical projection of each of the second antenna elements A12 projected onto the circuit substrate 1 is larger than an area of a vertical projection of the corresponding one of the first antenna elements A11 projected onto the circuit substrate 1. That is, an area of a vertical projection of each of the fourth antenna elements A22 projected onto the circuit substrate 1 is larger than an area of a vertical projection of a corresponding one of the third antenna elements A21 projected onto the circuit substrate 1. Moreover, a vertical projection of each of the second antenna elements A12 projected onto the circuit substrate 1 strictly overlaps an area of a vertical projection of a corresponding one of the first antenna elements A11 projected onto the circuit substrate 1, and an area of a vertical projection of each of the fourth antenna elements A22 projected onto the circuit substrate 1 strictly overlaps an area of a vertical projection of a corresponding one of the third antenna elements A21 projected onto the circuit substrate 1. In addition, a vertical projection of the antenna cover 2 projected onto the circuit substrate 1 completely covers vertical projections of the two second antenna elements A12 and the two fourth antenna elements A22 projected onto the circuit substrate 1. With the above structural configuration provided in the present disclosure, impedance matching generated by the antenna structure (the first antenna array A1 and the second antenna array A2) can be adjusted and optimized, and relatively stable performance in antenna characteristics, such as radiation directivities and the like, can be provided.

Based on the above, as shown in FIG. 2, the antenna structure formed by the first antenna array A1 and the second antenna array A2 of the present disclosure can be configured to operate in an operating frequency band with a frequency range of 3300 MHz-3800 MHz. Each of the second antenna elements A12 and the corresponding one of the first antenna elements A11 are separated by a first distance defining an air gap, and each of the fourth antenna elements and the corresponding one of the third antenna elements are separated by a second distance defining an air gap, and the first distance and the second distance are less than 5 mm. An upper surface 21 of the antenna cover and a second surface of the circuit substrate are separated by a first predetermined distance, the first predetermined distance is less than 8 mm. In addition, the two first antenna elements A1 are separated by a second predetermined distance, and the two second antenna elements A21 are separated by the second predetermined distance, and the second predetermined distance is greater than one-half wavelength of a center frequency (e.g., 3550 MHz) in the operating frequency band. Specifically, the second predetermined distance refers to a straight-line distance between positions corresponding to the two first antenna elements A11 (or the two second antenna elements A12), and refers to a straight-line distance between positions corresponding to the two third antenna elements A21 (or the two fourth antenna elements A22), for example, a straight-line distance between centers of the two first antenna elements A11 (or the two second antenna elements A12). In addition, in the present disclosure, the circuit substrate 1 is a printed circuit board (PCB) with low dielectric loss. Preferably, a dielectric coefficient of the circuit substrate 1 ranges from 3 to 4, and a dielectric loss of the circuit substrate 1 is less than 0.005. In addition, for example, a thickness of the circuit substrate ranges from 16 mil to 60 mil, and preferably, the thickness of the circuit substrate 1 is 20 mil. Thereby, the first antenna array A1 and the second antenna array A2 of the present disclosure form a high gain antenna structure through the above-mentioned structural configuration, and peak gains of the antenna in the operating frequency band (3300 MHz~3800 MHz) are all greater than 10 dBi.

Figure 6:
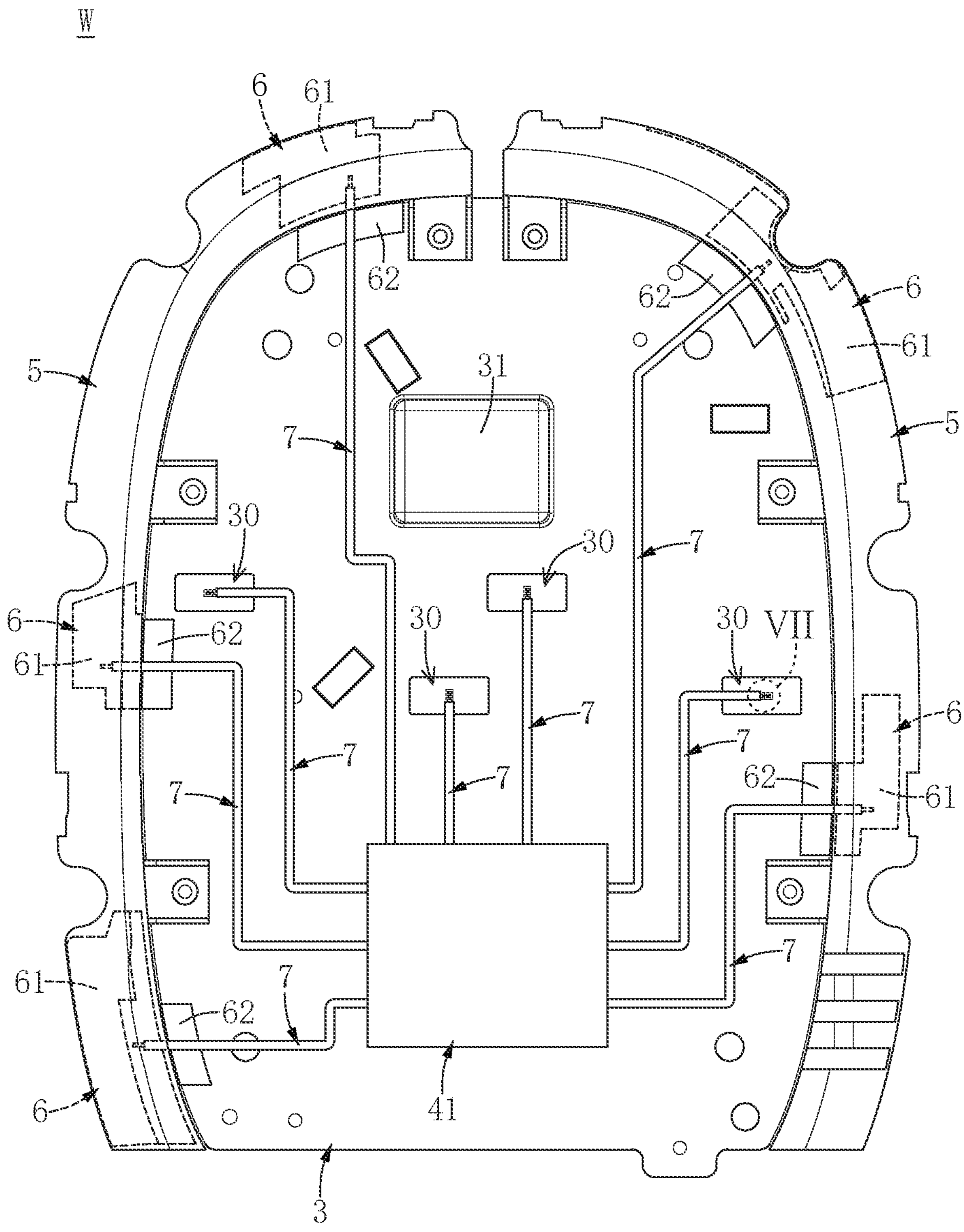
FIG. 6 is a schematic diagram showing circuit connections of the wireless communication device of the present disclosure.

Next, reference is made to FIGS. 2, 5, and 6, in which FIG. 5 is a schematic perspective view of a ground plate and an annular frame of the wireless communication device of the present disclosure, and FIG. 6 is a schematic diagram showing circuit connections of the wireless communication device of the present disclosure. The wireless communication device W further includes a ground plate 3, a mainboard 4 and an annular frame 5. The mainboard 4 includes the RF module 41 and other electronic components. The mainboard 4 and the circuit substrate 1 are respectively disposed on opposite sides of the ground plate 3 to avoid mutual interference between the electronic components on the mainboard 4 and the antenna elements on the circuit substrate 1. The annular frame 5 surrounds the ground plate 3 and fixes the ground plate 3 and the mainboard 4 in position. In this embodiment, an outline of the annular frame 5 is substantially elliptical in shape, and the annular frame 5 includes two frame parts; however, the present disclosure is not limited thereto, i.e., the outline of the annular frame 5 can be of any shape, and a quantity of the frame parts can be of any number. The circuit substrate 1 further includes a ground layer 10, and the ground layer 10 can be a thin metal plate disposed on the second surface 12 of the circuit substrate 1. The ground plate 3 is in contact with the ground layer 10. The mainboard 4 includes the RF module that is electrically connected to the first input port P11 of the first power divider P1, the second input port P21 of the second power divider P2, the third input port P31 of the third power divider P3, and the fourth input port P41 of the fourth power divider P4 through four coaxial cables 7, respectively. Furthermore, the ground plate 3 has four through holes corresponding to the first input port P11, the second input port P21, the third input port P31 and the fourth input port P41, respectively, and the RF module 41 is electrically connected to the first input port P11, the second input port P21, the third input port P31, and the fourth input port P41 respectively through the corresponding through holes 30.

Figure 7:
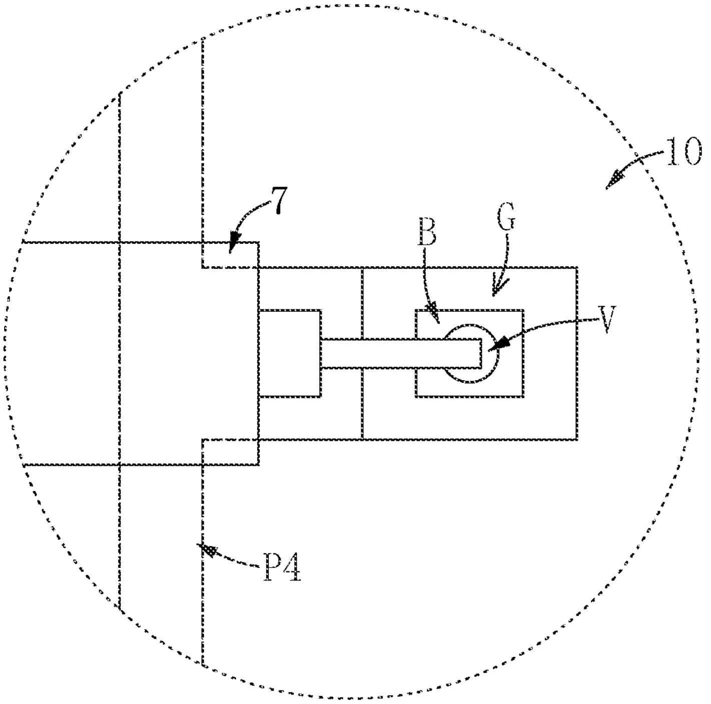
FIG. 7 is a schematic enlarged view of part VII of FIG. 6.
Figure 8:
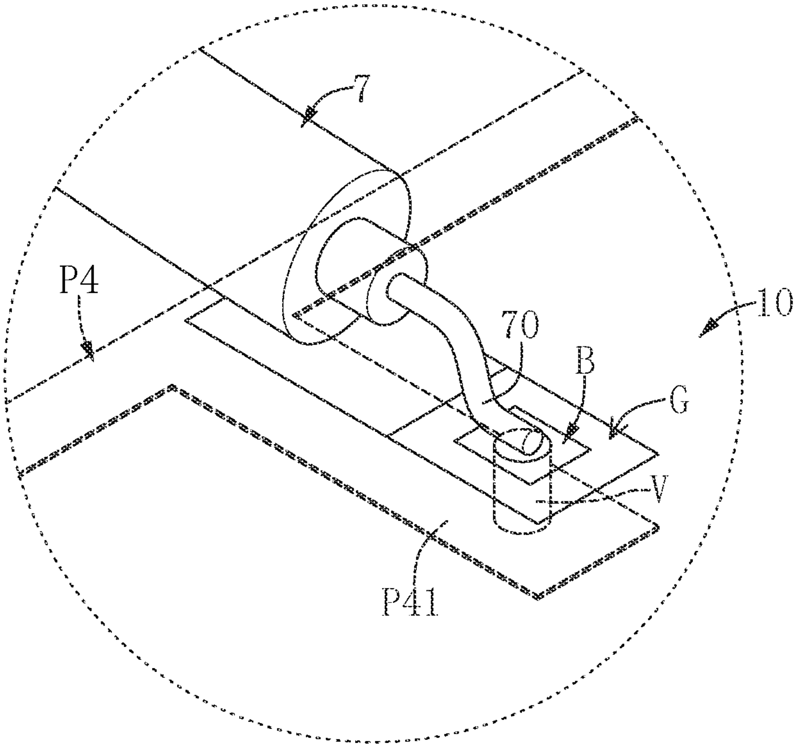
FIG. 8 is a schematic perspective view of FIG. 7.

Specific architectures of electrical connections between the coaxial cable 7 and any power divider can be referred to in FIGS. 7 and 8. FIG. 7 is a schematic enlarged view of part VII of FIG. 6, and FIG. 8 is a schematic perspective view of FIG. 7. A signal line 70 of each of the coaxial cable 7 contacts a conductive pad B, and there is a gap G between the conductive pad B and the ground layer 10, such that the conductive pad B and the ground layer 10 are separated from each other. Next, the signal line 70 is electrically connected to a conductive via V between the conductive pad B and the circuit substrate 1, and one end of the conductive via V is connected to the ground layer 10 and another end of the conductive via V is connected to the input port of a corresponding one of the power dividers. Therefore, the signal line 70 of each of the coaxial cables 7 can be electrically connected to the input port of the corresponding power divider (e.g., the fourth input port P41 of the fourth power divider P4 shown in FIG. 8) through the conductive pad B and the conductive via V. However, the present disclosure is not limited thereto. In other embodiments, the ground plate 3 may not have any through holes 30, and the coaxial cable 7 can bypass the ground plate 3 from a side of the ground plate 3 to the top to be electrically connected to the input port of the corresponding power divider on the circuit substrate 1.

Referring back to FIGS. 5 and 6, the ground plate 3 further has a protrusion region 31, and the protrusion region 31 extends in a direction toward the mainboard 4. More specifically, the protrusion region 31 extends toward a heat source of the mainboard 4, that is, the RF module 41. When the annular frame 5 fixes the ground plate 3 and the mainboard 4, the protrusion region 31 of the ground plate 3 contacts the mainboard 4, that is, the electronic components on the mainboard 4, such as but not limited to the RF module 41, such that the heat generated by the electronic components on the mainboard 4 can be conducted through the ground plate 3 for heat dissipation. In addition, the ground plate 3 can assist the first antenna array A1 and the second antenna array A2 to provide relatively stable radiation directivities and adjust an antenna gain thereof. In addition, it should be noted that the RF module 41 shown in FIG. 6 is actually disposed on the mainboard 4, but is omitted for more conveniently showing a positional relationship between the RF module 41 and the ground plate 3. In addition, the positional relationship between the RF module 41 and the ground plate 3 shown in FIG. 6 is for reference only, and does not represent actual positions of the RF module 41 (the actual position of the RF module 41 can be referred to FIG. 2), and the actual position of the RF module 41 can be in contact with the protrusion region 31, or can be adjusted according to circuit routing requirements around the RF module 41.

Reference is made to FIGS. 5 and 6, the wireless communication device W further includes an omnidirectional antenna structure 6 disposed on the annular frame 5, and the omnidirectional antenna structure 6 includes at least one radiating element 61 and at least one ground element 62 corresponding to the at least one radiating element 61. The at least one radiating element 61 and the at least one grounding element 62 can be a metal sheet, a flexible printed circuit board (FPCB) or other conductors with conductivities. The present disclosure is not limited in terms of a shape and a material of the omnidirectional antenna structure 6, nor the way that the omnidirectional antenna structure 6 is disposed on the annular frame. For example, the omnidirectional antenna structure 6 can also be embedded in the annular frame 5 by a metal element through a laser engraving process. In this embodiment, the omnidirectional antenna structure 6 includes five radiating elements 61 and five corresponding ground elements 62, which are evenly distributed in the annular frame 5, and the ground elements 62 are connected to the ground plate 3, but the present disclosure is not limited to quantities of the radiating elements 61 and the ground elements 62. Each of the radiating elements 61 and the RF module 41 can be electrically connected through one of the coaxial cables 7. Furthermore, a vertical projection of the at least one radiating element 61 projected onto a plane of the ground plate 3 does not overlap with a vertical projection of the ground plate 3 projected onto the plane, and a vertical projection of the at least one ground element 62 projected onto a plane of the ground plate 3 overlaps with a vertical projection of the ground plate 3 projected onto the plane, that is, the at least one radiating element 61 is located in an antenna clearance area (not covered by metal elements such as the ground plate 3). It is worth mentioning that the present disclosure is not limited to a type of the at least one radiating element 61, and the at least one radiating element 61 can be, for example, a monopole antenna or an inverted-F antenna (IFA), which can provide operating frequency bands ranging from 700 to 960 MHz, 1710 to 2170 MHz, and 2300 to 2700 MHz.

Beneficial Effects of the Embodiments

In conclusion, in the wireless communication device provided by the present disclosure, since the first antenna array A1 includes the two first antenna elements A11 and the two second antenna elements A12, the two first antenna elements A11 are disposed on the first surface 11 of the circuit substrate 1, the two second antenna elements A12 are disposed on the antenna cover 2 and correspond to the two first antenna elements A11, respectively, and each of the second antenna elements A12 and the corresponding one of the first antenna elements A11 are separated from and coupled to each other, a stacked antenna array structure can be formed to achieve high gain and miniaturized volume for the wireless communication device.

Further, in the present disclosure, a directional antenna structure is formed by the first antenna array A1 and the second antenna array A2, and at least one radiating element 61 and at least one ground element 62 are disposed in the annular frame 5 to form an omnidirectional antenna structure. That is, the present disclosure can integrate different antenna structures into one wireless communication device, so as to meet different user requirements on antenna characteristics.

Furthermore, the present disclosure provides certain structural configurations, including that: the area of the vertical projection of each of the second antenna element A12 projected onto the circuit substrate 1 is greater than and/or overlaps the area of the vertical projection of the corresponding one of the first antenna elements A11 projected onto the circuit substrate 1, the area of the vertical projection of each of the fourth antenna elements A22 projected onto the circuit substrate 1 is larger than and/or overlaps the area of the vertical projection of the corresponding one of the third antenna elements A21 projected onto the circuit substrate 1, and the vertical projection of the antenna cover 2 projected onto the circuit substrate 1 completely covers the vertical projection of the two second antenna elements A12 and the two fourth antenna elements A22 projected onto the circuit substrate 1, so that impedance matching generated by the antenna structure can be adjusted and optimized, and relatively stable performance in antenna characteristics can be provided.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A wireless communication device, comprising:
- a circuit substrate including a ground layer;
- an antenna cover disposed on the circuit substrate;
- a first antenna array disposed between the circuit substrate and the antenna cover, wherein the first antenna array includes:
- two first antenna elements disposed on a first surface of the circuit substrate; and
- two second antenna elements disposed on the antenna cover and corresponding to the two first antenna elements, respectively, wherein each of the second antenna elements and a corresponding one of the first antenna elements are separated from and coupled to each other;
- a first power divider including a first input port and two first output sections, wherein the first input port is connected between the two first output sections, and the two first output sections are connected to the two first antenna elements along a first direction, respectively;
- a ground plate being in contact with the ground layer;
- an annular frame surrounding the ground plate; and
- at least one radiating element disposed on the annular frame,
- wherein, in response to the two first antenna elements being fed with a first signal provided by a signal source from the first power divider, the first antenna array is configured to generate a radiation pattern having a first polarization direction.

2. The wireless communication device according to claim 1, further comprising:
- a second power divider including a second input port and two second output sections, wherein the second input port is connected between the second output sections, the two second output sections are connected to the two first antenna elements along a second direction, respectively, and the second direction is perpendicular to the first direction;
- wherein, in response to the two first antenna elements being fed with a second signal provided by the signal source from the second power divider, the first antenna array is configured to generate a radiation pattern with a second polarization direction, and the first polarization direction and the second polarization direction are orthogonal to each other.

3. The wireless communication device according to claim 2, further comprising:
- a second antenna array disposed between the circuit substrate and the antenna cover and disposed side by side with the first antenna array, wherein the second antenna array includes two third antenna elements and two fourth antenna elements, the third antenna elements are disposed on the first surface of the circuit substrate, the two fourth antenna elements are fixed on the antenna cover and correspond to the two third antenna elements, respectively, and each of the third antenna elements and a corresponding one of the fourth antenna elements are separated from and coupled to each other;
- a third power divider including a third input port and two third output sections, wherein the third input port is connected between the two third output sections, and the two third output sections are connected to the two third antenna elements along the first direction, respectively; and a fourth power divider including a fourth input port and two fourth output sections, wherein the fourth input port is connected between the fourth output sections, and the two fourth output sections are connected to the two third antenna elements along the second direction, respectively;

wherein, in response to the two third antenna elements being fed with a third signal provided by the signal source from the third power divider, the second antenna array is configured to generate a radiation pattern having a third polarization direction;

wherein, in response to the two third antenna elements being fed with a fourth signal provided by the signal source from the fourth power divider, the second antenna array is configured to generate a radiation pattern with a fourth polarization direction, and the third polarization direction and the fourth polarization direction are orthogonal to each other.

4. The wireless communication device according to claim 3, wherein the first power divider, the second power divider, the third power divider and the fourth power divider are in a staggered configuration, the first power divider and the second power divider are respectively arranged on both sides of the first antenna array, the third power divider and the fourth power divider are respectively arranged on both sides of the second antenna array, and the second power divider and the third power divider are arranged between the first antenna array and the second antenna array.

5. The wireless communication device according to claim 3, wherein a dielectric coefficient of the circuit substrate ranges from 3 to 4, and a dielectric loss of the circuit substrate is less than 0.005.

6. The wireless communication device according to claim 3, wherein a thickness of the circuit substrate ranges from 16 mil and 60 mil.

7. The wireless communication device according to claim 3, further comprising a ground plate and a mainboard, wherein the ground layer is disposed on a second surface of the circuit substrate, and the second surface is opposite to the first surface, wherein the mainboard and the circuit substrate are respectively disposed on opposite sides of the ground plate, and the mainboard includes a radio frequency module that is electrically connected to the first input port of the first power divider, the second input port of the second power divider, the third input port of the third power divider, and the fourth input port of the fourth power divider.

8. The wireless communication device according to claim 7, wherein the ground plate has four through holes corresponding to the first input port, the second input port, the third input port and the fourth input port, respectively, and the radio frequency module is electrically connected to the first input port, the second input port, the third input port, and the fourth input port respectively through the corresponding through holes.

9. The wireless communication device according to claim 7, wherein the ground plate further has a protrusion region, and the protrusion region extends toward a heat source of the mainboard.

10. The wireless communication device according to claim 7, wherein a vertical projection of the at least one radiating element projected onto a plane of the ground plate does not overlap with a vertical projection of the ground plate projected onto the plane.

11. The wireless communication device according to claim 3, wherein a vertical projection of the antenna cover projected onto the circuit substrate completely covers vertical projections of the second antenna elements and the fourth antenna elements projected onto the circuit substrate.

12. The wireless communication device according to claim 3, wherein each of the second antenna elements and the corresponding one of the first antenna elements are separated by a first distance, or each of the fourth antenna elements and the corresponding one of the third antenna elements are separated by a second distance, and the first distance and the second distance are less than 5 mm.

13. The wireless communication device according to claim 3, wherein an upper surface of the antenna cover and a second surface of the circuit substrate are separated by a first predetermined distance, the first predetermined distance is less than 8 mm, and the second surface is opposite to the first surface.

14. The wireless communication device according to claim 1, wherein a vertical projection of each of the second antenna elements projected onto the circuit substrate completely overlaps with a vertical projection of a corresponding one of the first antenna elements projected onto the circuit substrate.

15. The wireless communication device according to claim 1, wherein an area of a vertical projection of each of the second antenna elements projected onto the circuit substrate is greater than an area of a vertical projection of a corresponding one of the first antenna elements projected onto the circuit substrate.

16. The wireless communication device of claim 1, wherein the first antenna array is configured to operate in an operating frequency band, centers of the two first antenna elements are spaced apart by a second predetermined distance, or centers of the two second antenna elements are spaced apart by a second predetermined distance, and the second predetermined distance is greater than one-half of a wavelength of a center frequency in the operating frequency band.

* * * * *